United States Patent
Lu et al.

(10) Patent No.: US 10,923,906 B2
(45) Date of Patent: Feb. 16, 2021

(54) FAULT SWITCH CONFIGURATION AND CLEARING METHOD IN FLEXIBLE DC CONVERTER STATION

(71) Applicants: NR ELECTRIC CO., LTD, Jiangsu (CN); NR ENGINEERING CO., LTD, Jiangsu (CN)

(72) Inventors: Yu Lu, Jiangsu (CN); Gang Li, Jiangsu (CN); Jie Tian, Jiangsu (CN); Nannan Wang, Jiangsu (CN); Haiying Li, Jiangsu (CN); Chongxue Jiang, Jiangsu (CN); Shunke Sui, Jiangsu (CN)

(73) Assignees: NR ELECTRIC CO., LTD., Jiangsu (CN); NR ENGINEERING CO., LTD., Jiangsu (CN)

( * ) Notice: Subject to any disclaimer, the term of this patent is extended or adjusted under 35 U.S.C. 154(b) by 0 days.

(21) Appl. No.: 16/500,189

(22) PCT Filed: May 22, 2018

(86) PCT No.: PCT/CN2018/087791
§ 371 (c)(1),
(2) Date: Oct. 2, 2019

(87) PCT Pub. No.: WO2018/219174
PCT Pub. Date: Dec. 6, 2018

(65) Prior Publication Data
US 2020/0220349 A1 Jul. 9, 2020

(30) Foreign Application Priority Data
Jun. 2, 2017 (CN) .......................... 201710406486.2

(51) Int. Cl.
*H02H 7/125* (2006.01)
*H02H 7/26* (2006.01)
(Continued)

(52) U.S. Cl.
CPC .............. *H02H 7/125* (2013.01); *H02H 7/26* (2013.01); *H02J 3/36* (2013.01); *H02M 7/062* (2013.01)

(58) Field of Classification Search
CPC ............ H02H 3/087; H02H 7/10; H02H 7/12; H02H 7/125; H02H 7/1252; H02H 7/1255;
(Continued)

(56) References Cited

U.S. PATENT DOCUMENTS

2013/0070491 A1* 3/2013 Jiang-Hafner .......... H02M 5/46
363/41
2017/0288569 A1 10/2017 Uda et al.

FOREIGN PATENT DOCUMENTS

CN 103606911 A 2/2014
CN 103986176 A 8/2014
(Continued)

OTHER PUBLICATIONS

ISA/CN, International Search Report dated Aug. 24, 2018 for International Patent Application No. PCT/CN2018/087791, 4 pages.
(Continued)

*Primary Examiner* — Jared Fureman
*Assistant Examiner* — Christopher J Clark
(74) *Attorney, Agent, or Firm* — Masuvalley & Partners

(57) ABSTRACT

A fault switch configuration and clearing method in a flexible DC converter station, the flexible DC converter station is configured with a grid side switch and a valve side phase-split switch in the converter station. When a fault occurs, a faulty phase and a non-faulty phase are detected and identified by means of differential protection or low voltage overcurrent. An alternating current zero crossing condition is created by means of firstly turn off the non-faulty phase valve side phase-split switch and the grid side switch, thereby cutting off the faulty phase, disconnecting
(Continued)

the connection between a power supply and a fault point, and achieving the clearing for faults. The described fault-clearing method is simple and practical, highly reliable, and connection between the fault point and the power supply is quickly and effectively cut; converter station equipment is effectively protected, and further expansion of the fault is avoided.

5 Claims, 2 Drawing Sheets

(51) Int. Cl.
*H02J 3/36* (2006.01)
*H02M 7/06* (2006.01)

(58) Field of Classification Search
CPC ........ H02H 7/1257; H02H 7/26; H02H 7/268; H02H 7/30; H02H 7/106; H02H 7/1203; H02J 3/36; H02J 5/00; H02M 7/00–98; G01R 31/085
See application file for complete search history.

(56) References Cited

FOREIGN PATENT DOCUMENTS

| | | |
|---|---|---|
| CN | 105703336 A | 6/2016 |
| CN | 107093890 A | 8/2017 |
| JP | 2005204368 A | 7/2005 |
| WO | 2007/084036 A1 | 7/2007 |
| WO | 2016056072 A1 | 4/2016 |

OTHER PUBLICATIONS

Japanese Office Action dated Jun. 30, 2020 in Japanese application No. 2019-551432, total 6 pages with translation.

* cited by examiner

FAULT SWITCH CONFIGURATION AND CLEARING METHOD IN FLEXIBLE DC CONVERTER STATION

RELATED APPLICATIONS

This application is the U.S. National Phase of and claims priority to International Patent Application No. PCT/CN2018/087791, International Filing Date May 22, 2018; which claims benefit of Chinese Patent Application No. 201710406486.2 filed Jun. 2, 2017; both of which are incorporated herein by reference in their entireties.

TECHNICAL FIELD

The present invention belongs to the field of flexible transmission and flexible alternating current (AC) transmission of power system, and particularly relates to a fault switch configuration and a clearing method in a flexible DC converter station.

BACKGROUND

Flexible direct current (DC) transmission and a new generation of flexible AC transmission use voltage source converters, which can independently adjust active and reactive power to improve the transmission capacity of the AC system. It has obvious competitiveness in applications such as power generation grids for renewable energy, power supply for isolated islands, and interconnection of communication systems. With the development of power electronics and control technology, the capacity and voltage levels of flexible DC transmission and flexible AC transmission systems are getting higher and higher.

In order to maintain the stability of DC voltage, flexible DC transmission requires the use of AC valve side grounding or DC side grounding to clamp DC voltage. The DC side grounding method includes a DC side monopolar grounding method, a high resistance DC side high impedance grounding, and the like. As the flexible DC transmission voltage level becomes higher and higher, a true bipolar topology is used to reduce the number of cascades of a single converter unit sub-module to achieve a large-capacity transmission power. The structure of the bipolar flexible DC transmission system usually uses the DC side grounding, and the DC side grounding causes the following problems: when the valve side and the bridge arm of the converter station are grounded or short-circuited, a loop is formed with the DC-side grounding system, and a DC bias is superimposed on the alternating current, which causes the current flowing through the grid side switch to have no zero crossing point, and thereby causes the AC switch to fail to trip, which may damage equipment such as mechanical switches and converter valves.

Patent CN201510999677.5 proposes to reduce the DC bias of the AC current by bypassing the lower bridge arm sub-module of a non-faulty phase of the converter valve. The method is for a single-phase ground fault, and the converter valve sub-module is triggered again after the converter valve is locked. In the case of a fault, the current rapidly changes, the converter valve is triggered again after being locked. This requires accurate fault diagnosis, and also requires the valve control system to perform quickly and reliably, and there is a great risk, which is a test for the switching device. At present, the flexible DC converter station is generally equipped with an AC switch (QF1) on the grid side and no switch (QF2) on the valve side. Even if the switch (QF2) is arranged on the valve side, the valve side switch does not perform the selection for faulty phase, and it does not cooperate with the grid side switch (QF1) by timing cooperation to solve the problem that the AC switch cannot be tripped and the AC switch is damaged because there is no zero-crossing of AC current due to a grounding fault in the converter station.

In the past, the faulty phase selection of AC protection generally selects to firstly trip the faulty phase, but not to trip the non-faulty phase, which cannot solve the problem that there is no zero-crossing of AC current and the switch could not be broke, which is caused by the fault in the converter station brought by the DC side grounding.

In order to achieve a reliable solution to the problem that the AC cannot be broken when an asymmetrical fault occurs in the converter station caused by the DC side grounding, to ensure the safety of the mechanical switch and the converter station equipment, to prevent the switch from failing to trip and to prevent the fault from getting worse, the present invention provides a grid side switch (QF1) and a valve side switch (QF2) which cooperates with each other in the flexible DC converter station. The grid side switch cooperates with the valve side switch, after detecting the grounding fault in the converter station, firstly trip the valve side non-faulty phase, and then trip the grid side switch by the valve side phase-split switch, and thereby the internal fault of the converter station can be quickly and effectively cleared while ensuring the safety of the AC switch.

SUMMARY

The object of the present invention is to provide a fault switch configuration and a clearing method suitable for a DC-side grounding converter station. In addition to the grid side switch (QF1), the flexible DC converter station is provided with a valve side phase-split switch (QF2). The grid side switch and the valve side switch cooperate with each other. After the protection system detects a grounding fault and a faulty phase in the converter station, firstly, the non-faulty phase on the valve side is tripped, and then the grid side switch is tripped, so that the fault in the converter station can be quickly and effectively cleared while ensuring the safety of the AC switch, and the fault in the converter station can be truly cleared, the safe operation of the converter station equipment can be ensured, and prevent the influence of the fault from expanding.

In order to achieve the above object, the solutions of the present invention are described as below:

A fault switch configuration and clearing method in a flexible DC converter station is provided, wherein a flexible DC converter station respectively configured with a grid side switch (QF1) and a valve side phase-split switch (QF2), and when a fault occurs in the converter station, firstly tripping a valve side non-faulty phase switch, then tripping the grid side switch, and performing the clearing for faults in the converter station, the clearing method for the faults specifically includes:

1) recognizing, by a protection system, a faulty phase and a non-faulty phase when a fault is detected in the converter station;

2) sending a non-faulty phase valve side switch (QF2) trip command at time t1;

3) sending a grid side switch (QF1) trip command at time t2;

4) the relationship between t1 and t2 is t1≤t2.

5) sending a faulty phase valve side switch (QF2) trip command after a time interval Δt, after tripping the grid side switch (QF1).

According to the fault switch configuration and a clearing method in a flexible DC converter station, further the protection system may use a differential protection detection to obtain a faulty phase or a valve side low voltage overcurrent to determine a fault location and a faulty phase.

According to the fault switch configuration and a clearing method in a flexible DC converter station, further the value of t1 ranges from 0 to 10 s, the value of t2 ranges from 0 to 15 s, and the time interval Δt ranges from 0 to ∞.

According to the fault switch configuration and a clearing method in a flexible DC converter station, the configured valve side switch (QF2) is a phase-split switch.

According to the fault switch configuration and a clearing method in a flexible DC converter station, the fault region in the converter station mainly refers to a fault between a synchronous voltage Us and the positive bus bar and the negative bus bar.

DESCRIPTION OF EMBODIMENTS

The technical solutions of the present invention will be described in detail below with reference to the accompanying drawings and specific embodiments.

The invention studies faults in a converter station of a DC side grounding system and provides a switch configuration and a clearing method. The grounding of a converter valve can be achieved by closing a grounding switch QS5 in FIG. 1.

Generally, the flexible DC transmission converter station is equipped with a grid side switch (QF1) and without a valve side switch (QF2). Unless some converter stations with three-winding transformers are equipped with valve-side switches (QF2), the third winding of the transformer is used for station power supply. The purpose of configuring the valve-side switch (QF2) is to enable the operation of the transformer during maintenance of the converter valve.

Figure 1:
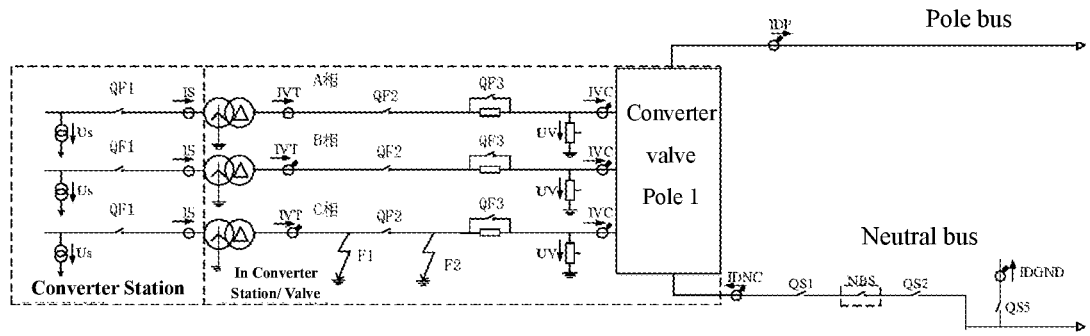
FIG. 1 is a schematic view of switch positions and faulty locations in a faulty converter station according to the present invention.

FIG. 1: grid side synchronous voltage Us, grid side current IS, grid side switch QF1, valve side phase-split switch QF2, transformer valve side bushing current IVT, bypass switch QF3, valve side voltage UV, valve side current IVC, DC bus current IDP, neutral bus current IDNE.

Figure 2:
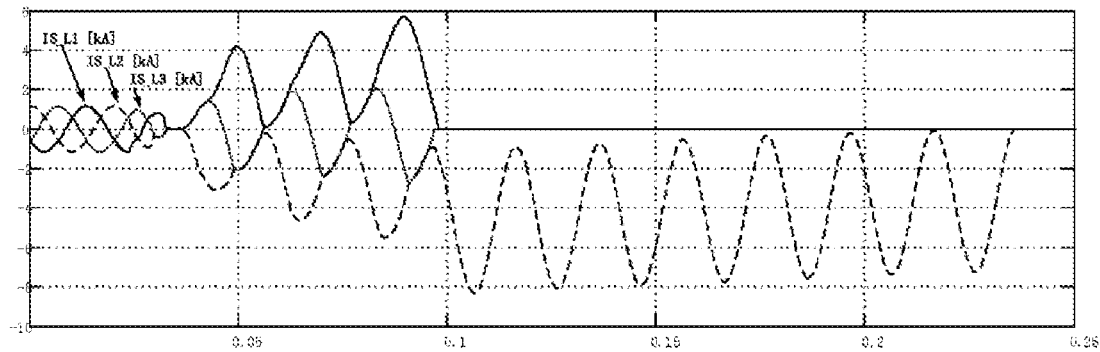
FIG. 2 is a waveform diagram of the fault current in the case where only the grid side switch is tripped when a valve side failure occurs.
Figure 2:
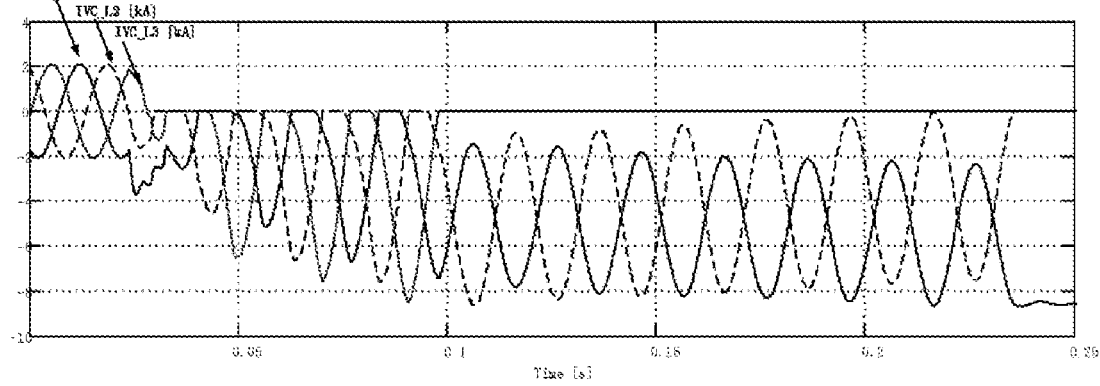

Taking grounding faults of C-phase positions F1 or F2 of the converter valve pole 1 as an example, the grid side current and the valve side current after F1 fault at the 0.02 s time of the converter valve side AC connection area are shown in FIG. 2. IS_A, IS_B and IS_C in FIG. 2 are three-phase currents on the grid side respectively and IVC_A, IVC_B, and IVC_C are currents on the valve side. As shown in FIG. 2, the phase A current and the phase B on the grid side has no zero-crossing, if only provided with the grid side switch (QF1) and without the valve side switch (QF2), the switch trip command is issued at 0.08 s. As shown in FIG. 2, since the B phase current has no zero-crossing, it needs about 140 ms after the switch trip command is sent to turn on the grid side switch, and in this process, since there is no zero-crossing point to forcibly turn off the switch QF1, the switch contacts and the like are damaged, and the fault cannot be effectively cleared.

For the valve side fault in the converter station, the analysis found that there is a zero crossing point on the non-faulty phase valve side current. Through a series of calculations and analysis, the valve side is added with a phase-split switch QF2. After detecting the fault in the converter station, firstly trip the non-faulty phase valve side current, since there is a zero crossing point on the non-faulty phase valve side, trip the valve side switch QF2 correspondingly, which can separate the non-faulty phase on the valve side from fault position, then the grid-side current crosses zero point, at this time, trip the grid-side switch again, and thereby fault isolation can be achieved without causing damage to the faulty switch devices.

Specific steps are as follows:

1. In addition to the grid side switch (QF1), the flexible DC converter station is configured with a valve side phase-split switch (QF2).

2. A control and protection system in the converter station can rely on the differential current (IVT-IVC) between IVT and IVC to be greater than the set value Idelt. Idelt takes the rated value of 1.0 pu. It is considered that if the fault position is on the valve side of the converter station, it is a faulty phase. Otherwise, it is a non-faulty phase.

3. After detecting and identifying the fault position and the faulty phase, the converter valve control protection system delays time t1 to send a non-faulty phase trip command to the valve side switch (QF2), and t1 is set within (0-10 s).

4. The control and protection system in the converter station delays time t2 to send to the grid side switch QF1, and t2 is set within (0-15 s).

5. The relationship between t1 and t2 is t1≤t2.

6. After the grid side switch is tripped, delay time Δt to send the faulty phase trip command to the valve side switch (QF2), and Δt is set within (0-∞s).

7. After the above steps, the three-phase QF1 and QF2 switches are tripped, and the fault is cleared without damaging the switch.

Figure 3:
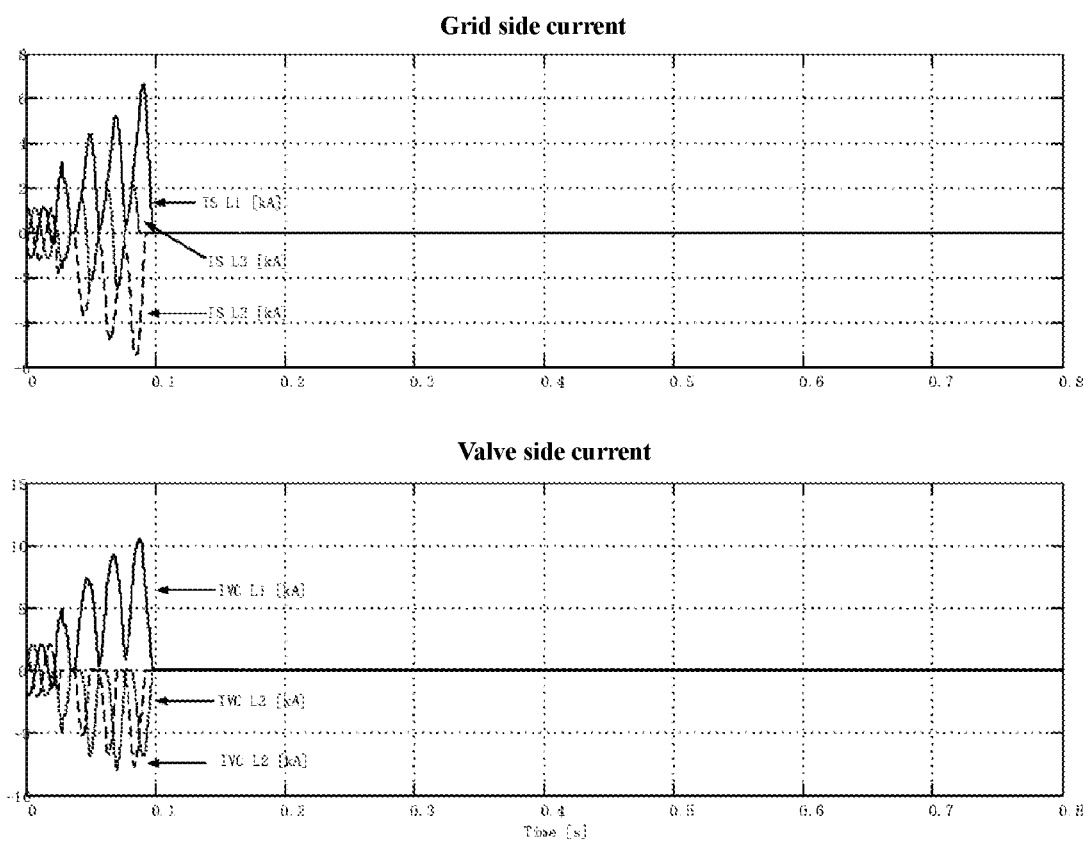
FIG. 3 is a waveform diagram of the fault current in the case where the grid side switch and the valve side switch are tripped in cooperation with each other when a valve side failure occurs.

According to the fault switch configuration and clearing method in a flexible DC converter station of the present invention, after a valve side grounding fault occurs, the fault clear waveform is as shown in FIG. 3, a fault occurs at 0.02 s, and a valve side non-faulty phase trip command is issued at 0.06 s. A grid side switch trip command is sent out with 1 ms delay, and the fault is cleared within 20 ms since the switch command is sent. There is no problem that the fault switch cannot be turned on and the switch is damaged and the fault cannot be cleared.

The present invention introduces an embodiment in which the single-phase grounding fault of the converter-side AC connection region F1 or F2 is taken as an example, but the present invention is not limited to a single-phase grounding fault, and is applicable to clearing methods for other grounding faults or short-circuit faults in the converter station, for example, a bridge arm reactor is grounded and other faults.

The foregoing embodiments are used to explain the technical idea of the present invention, but are not intended to limit the scope of protection of the preset invention. Any modification made based on the technical solutions according to the technical idea of the present invention shall fall within the scope of protection of the present invention.

What is claimed is:

1. A method for clearing faults in a flexible DC converter station, characterized in that: the flexible DC converter station is configured with a grid side switch (QF1) and a plurality of valve side switches (QF2), the method for clearing faults including:
   recognizing, by a protection system, a faulty phase and a non-faulty phase when a fault occurs in the converter station;
   sending a non-faulty phase valve side switch (QF2) trip command to a valve side switch on the non-faulty phase at time t1, and sending a grid side switch (QF1) trip command to the grid side switch at time t2, wherein the relationship between t1 and t2 is t1≤t2; and
   sending a faulty phase valve side switch (QF2) trip command to a valve side switch on the faulty phase after a time interval Δt, after tripping the grid side switch (QF1).

2. The fault switch configuration and clearing method in a flexible DC converter station according to claim 1, characterized in that the faulty phase is detected by using differential protection, or the faulty phase is determined according to a low voltage overcurrent of the valve side.

3. The fault switch configuration and clearing method in a flexible DC converter station according to claim 1, wherein the value of t1 ranges from 0 to 10 s, and the value of t2 ranges from 0 to 15 s.

4. The fault switch configuration and clearing method in a flexible DC converter station according to claim 1, wherein each of the valve side switches (QF2) uses a phase-split switch.

5. The fault switch configuration and clearing method in the flexible DC converter station according to claim 1, wherein the fault in the converter station is a fault in a region between the secondary side of a transformer, a pole bus and a neutral bus.

* * * * *